United States Patent
Bonnet

(10) Patent No.: US 7,061,620 B2
(45) Date of Patent: Jun. 13, 2006

(54) METHOD AND APPARATUS FOR THREE-DIMENSIONAL OBJECT DETECTION

(76) Inventor: Gerhard Bonnet, Cottbuser Weg 16, Mannheim, D-68309 (DE)

(*) Notice: Subject to any disclaimer, the term of this patent is extended or adjusted under 35 U.S.C. 154(b) by 254 days.

(21) Appl. No.: 10/380,576

(22) PCT Filed: Sep. 10, 2001

(86) PCT No.: PCT/EP01/10416

§ 371 (c)(1),
(2), (4) Date: Apr. 22, 2003

(87) PCT Pub. No.: WO02/23120

PCT Pub. Date: Mar. 21, 2002

(65) Prior Publication Data

US 2003/0184760 A1    Oct. 2, 2003

(30) Foreign Application Priority Data

Sep. 13, 2000  (DE) ................. 100 45 535

(51) Int. Cl.
*G01B 11/02* (2006.01)

(52) U.S. Cl. .................................... 356/489
(58) Field of Classification Search ............... 356/485, 356/486, 487, 489, 497, 511, 512, 513, 514
See application file for complete search history.

(56) References Cited

U.S. PATENT DOCUMENTS 5,835,199 A  11/1998  Phillips et al. ............. 356/5.03
5,910,660 A * 6/1999  Hodel et al. ............ 250/559.22
5,917,596 A  6/1999  Jenkins et al. ............... 356/345
5,956,355 A  9/1999  Swanson et al.
6,493,091 B1 * 12/2002  Kourogi et al. ............. 356/489

FOREIGN PATENT DOCUMENTS

JP  10-982858  3/1998

OTHER PUBLICATIONS

Nakamura, K. et al.: *Optical Frequency Domain Ranging by a Frequency-Shifted Feedback Laser* IEEE Journal of Quantum Electronics, IEEE, Inc., New York, Mar. 2000.

Nakamura, K. et al: *Spectral Characteristics of an All Solid-State Frequency-Shifted Feedback Laser* IEEE Photonics Technology Letters, IEEE, Inc., New York, 1997.

Nakamura, K. et al.: *A New Technique of Optical Ranging by a Frequency-Shifted Feedback Laser* IEEE Photonics Technology Letters, IEEE, Inc., New York, Dec. 1998.

Nakamura, K. et al.: *Observation of a Highly Phase-Correlated Chirped Frequency Comb Output From a Frequency-Shifted Feedback Laser* Applied Physics Letters, May 25, 1998.

\* cited by examiner

*Primary Examiner*—Samuel A. Turner
(74) *Attorney, Agent, or Firm*—Baker & Daniels

(57) ABSTRACT

A fundamental concept of the invention consists thus in the fact that temporally variable reference and object light bundles are generated for object detection, the bundles are superimposed at a light receiver and detected beam by beam and the penetration of the object by selected beams is determined in response to the temporal variability of the superimposed beams.

20 Claims, 3 Drawing Sheets

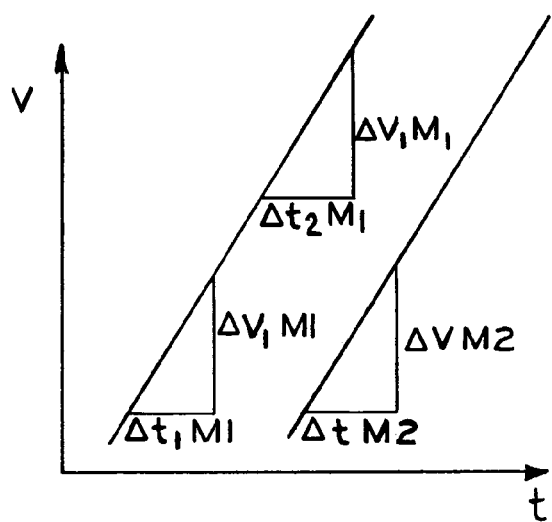
FIG_2c
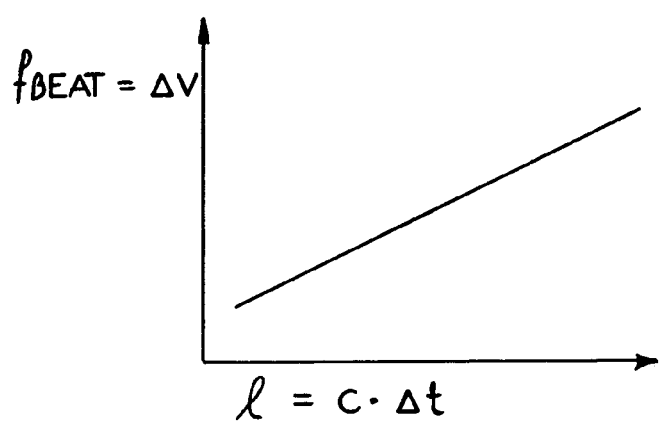
FIG_2d

METHOD AND APPARATUS FOR THREE-DIMENSIONAL OBJECT DETECTION

BACKGROUND OF THE INVENTION

The present invention relates to a method and a device in accordance with the generic terms of the independent claims. Thus the present invention is concerned with the detection of three-dimensional objects, in particular with the determination of the spatial depth of an expanded three-dimensional object.

It is frequently desirable to scan a given object three-dimensionally. For example, this is the case when a complicated workpiece should be inspected to determine whether it has been created accurate to dimension or when a given object is to be measured precisely.

As a rule it is possible to achieve a two-dimensional image of a three-dimensional object by means of projecting an object image to a sensor surface or the like. On the other hand, measurement into a third dimension, namely the measurement of a spatial depth, as a rule causes greater problems. For example, it has been proposed to send short light impulses out as with a sonic altimeter and to measure the time until reception of the backscattered or reflected impulses. However, measurement with light is very difficult here due to the extremely low run times, in addition room depth information can only be gained from spatially expanded objects with great expenditure.

There are also interferometric methods that have been known for a long time, in which a light beam is split up into a reference light beam and an object light beam. The object light beam is irradiated onto an object and received back from it. The reference and object light beams are then superimposed at a light receiver and then, provided there is sufficient coherence of both beams, the distance of the object is inferred from the phase location. This method allows high-precision measurements; however the depth measurement causes difficulties with expanded objects at different places.

In addition, performing distance measurements using frequency-shifted feedback lasers (FSF laser) is also well known. An example of this can be found in the essay by K. NAKAMURA, T. MIYAHARA M. YOSHIDA, T. HARA and H. ITO "A new technique of optical ranging by a frequency-shifted feedback laser" IEEEE Photonics Technology Letters, volume 10, 1998, pages 1772 pp. The principle of FSF lasers and the emission obtained from them is described in detail in the essay "Observation of a highly phase-correlated chirped frequency comb output from a frequency-shifted feedback laser" by K. NAKAMURA, T. MIYAHARA and H. ITO, Applied Physics Letters, Volume 72, No. 21, pages 2631 pp. as well as in the essay "Spectral Characteristics of an All Solid-State Frequency-Shifted Feedback Laser" by K. NAKAMURA, F. ABE, K. KASAHARA, T. HARA, M. SATO and H. ITO in IEEE-JOURNAL OF QUANTUM ELECTRONICS, Volume 33, pages 103 pp.

The authors of the documents above-named that have been included in their entirety for publication purposes proposed using an FSF laser, which has an acousto-optical modulator in its optical resonator, which is operated at about 80 MHz. The beam of the FSF laser is split at a beam splitter into a reference beam and a measuring beam. The measuring beam passes through a glass fiber serving as an object with the reference beam and is merged together again at a further beam splitter and irradiated on a single detector element, whose output is examined with a high-frequency spectral analyzer.

SUMMARY OF THE INVENTION

One object of the present invention consists in detecting expanded objects and making them measurable with regard to their spatial depth.

The independent claims specify how this objective can be achieved. Preferred embodiments are found in the subordinate claims.

A fundamental concept of the invention consists thus in the fact that temporally variable reference and object light bundles are generated for object detection, the bundles are superimposed at a light receiver and detected beam by beam and the penetration of the object by selected beams is determined in response to the temporal variability of the superimposed beams.

In the process, it is first important that expanded light bundles are generated and superimposed at a light receiver, but single beams within the bundle be detected, to specify the penetration of the object at these selected beams. With this it becomes easily possible to perform locally resolved measurements on expanded objects through selection using temporally variable reference and object light beams.

In a preferred variant the light bundles possess a comb-like frequency structure, whereby the comb is tuned, that is, all frequencies of the light bundle are changed simultaneously. This can be achieved in particular with FSF lasers.

In a particularly preferred variant of the method successively differing modulator or tuning frequencies are used. The typical, periodically repeating temporal variability of reference and object light bundles results in the fact that the allocation between penetration of the object and temporal variability is not unique. The use of several modulator frequencies makes it possible to resolve this non-uniqueness with a single frequency.

The generation of the reference and object light bundles can occur in a laser resonator, in which an amplifying medium is arranged. The tuning occurs in the process preferably with a high-frequency excited acousto-optical modulator.

In a particularly preferred variant of the method the light bundles are analyzed beam by beam, by providing a light-sensitive receiver from a number of detection elements, whereby the beams to be examined are determined by means of selection of individual beam elements.

In a particularly preferred variant the method provides that the detection element selection is variable. A modification can in the process particularly occur as a result of the fact that an image of the object is generated, to be precise with another or with the same light receiver, whereby then on this image dots with the penetration to be determined are selected. The detection elements allocated to these places can be examined with regard to the temporal variability of the superimposed beams that fall on them.

An application for protection is also being filed for a device that is suitable for practicing the method. In a particularly preferred variant of the device, an FSF laser, that is, a frequency-shifted feedback laser is provided as a bundle generation medium, which in its resonator along with a light amplifier unit, that is a light amplifier medium, also includes a modulator. The modulator is preferably modulated with frequencies between 0.1 MHz and 500 MHz, whereby modulation with radio frequencies around 100 MHz is particularly advantageous. The lower frequencies reduce the resolution attainable with the device, while very high frequencies greatly increase the demands on the measuring system.

The examination of the temporal variability of the superimposed reference and object light bundles is performed in a preferred example by conducting signals from those detection elements that are to be scanned by means of a multiplexer to an evaluation unit.

In a preferred variant an imaging sensor can be provided, whereby on the one hand an image of the object is taken and on the other hand the penetration of specific pixels is detected. It is possible to separate the detection elements for object penetration determination from those elements of an imaging detector, in order in this way to make possible an optimization of the respective light receivers on the one hand for high spatial resolution and on the other hand for high sensitivity to the temporal variability. Furthermore, it is preferred when the imaging sensor and the object penetration measuring light receiver have differing spectral sensitivities, to be precise, in particular that the imaging sensor either is not or is only marginally sensitive to wavelengths and/or the frequency range of the light receiver. Thus the image recording will not be disturbed or almost not disturbed by the object penetration determination.

BRIEF DESCRIPTION OF THE DRAWINGS

The invention is described in the following using the drawing. In this drawing, the figures show the following:

FIG. 2c the relationship between beat frequency and run time difference; and

FIG. 2d the relationship between beat frequency and object penetration for a given tuning frequency.

DETAILED DESCRIPTION OF THE INVENTION

Figure 1:
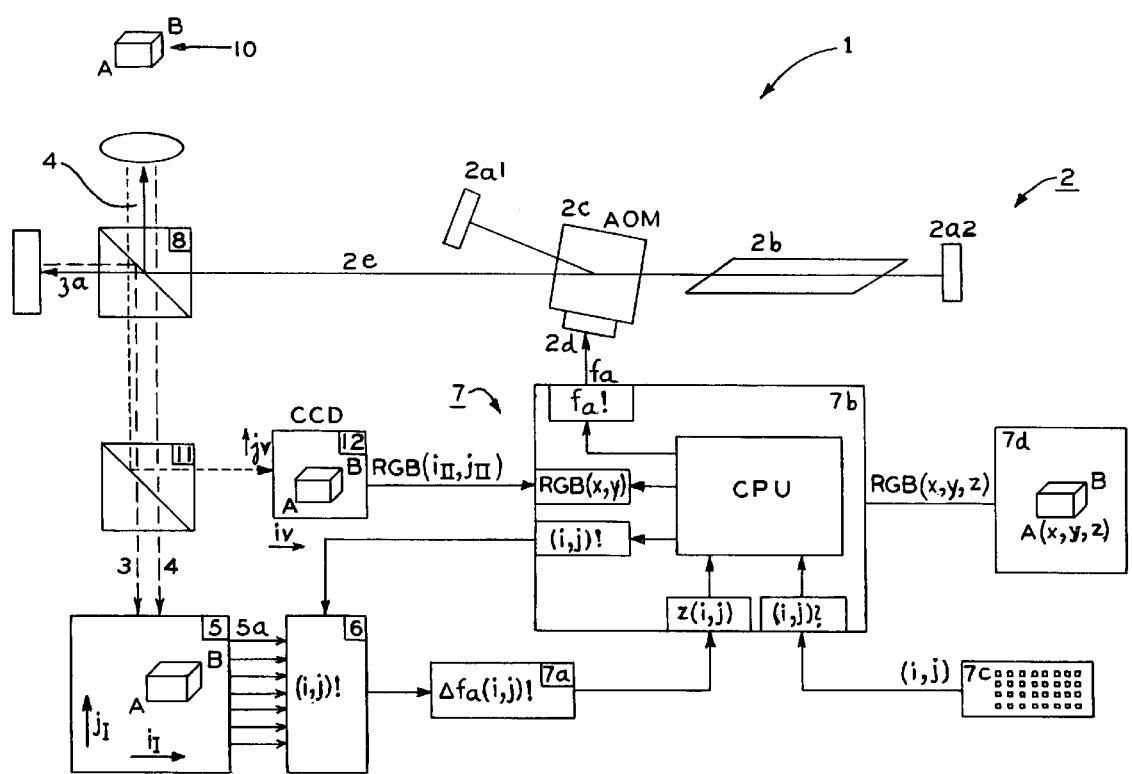
FIG. 1 an arrangement according to the present invention.

According to FIG. 1 an object penetration determination device 1 includes a light bundle generation medium 2 for generation of a temporally variable reference light bundle 3 and an object light bundle 4, a light receiver 5, on which object and reference light bundles 3, 4 are superimposed, a selection unit 6 for selection of individual beams to be evaluated in the light bundles 3, 4 superimposed on the light receiver 5, as well as an evaluation unit 7 for evaluation of object penetration.

The light bundle generation medium 2 includes an optical resonator formed by means of highly reflecting mirrors 2a1, 2a2, in which an amplification medium 2b and an acousto-optical modulator 2c are arranged. The acousto-optical modulator 2c receives high frequency energy from a frequency generator 2d in a range between 0.1 MHz and 500 MHz, which results in a temporal variability of the radiated light, as is to be explained later.

A beam splitter 8 is provided in the output light bundle 2e of the light bundle generation medium 2, which splits the output light beam 2e into a partial bundle directed at an object 10 and a reference light bundle 3. In the beam path of the reference light bundle 3 a back reflector is arranged at a fixed reference distance, which, by means of the beam splitter 8, reflects back the reference light bundle 3 to the light receiver 5, while the partial bundle directed at object 10 is reflected back by said back reflector and as object light bundle 4 the beam splitter 8 is also continuously emitted to light receiver 5, to be precise, in such a way that object light bundle 4 and reference light bundle 3 are superimposed there.

The light receiver 5 is built as a CMOS-element field out of a matrix of M×N CMOS elements (i, j), which are individually addressable by means of their indices $j_I$, $i_I$. From each element (i, j) of the CMOS field of light receiver 5 a line 5a goes to the selection unit 6, which is designed as a multiplexer and switches signals either of only one or a small number of detection elements to a demodulation unit 7a. The demodulation unit is designed for the purpose of analyzing the temporal variability of the output light bundle 2e in the superimposition of reference light bundle 3 and object light bundle 4 for the individual elements caused by acousto-optical modulation by means of the acousto-optical modulator 2c and specifying a representative size for the beat of the same.

The output of the demodulation unit 7a is fed to an input of a central data processing unit 7b, which also has input medium 7c and output medium 7d, and with which in particular the frequency fa which is to be preselected at the frequency generator 2d driving to the acousto-optical modulator 2c can be determined as well as those matrix elements i, j of the CMOS array of the light receiver 5, whose signal is fed to the demodulation unit 7a.

In the beam path between the beam splitter 8 and the light receiver 5 a partially transparent mirror 11 is additionally provided, with which light from object 10 can be reflected onto an imaging receiver 12 developed here for example as a CCD matrix. The output signal of all elements ($i_{II}$, $j_{II}$) of the imaging receiver 12 is also fed to the central data processing unit. An allocation unit is provided there, which allocates those CMOS elements (i,j) to the CCD elements that detect the same object range.

For the purpose of explaining the function of the arrangement reference is first made to the FIGS. 2a through 2d, which illustrate the emission behavior of the light bundle generation medium as well as the signals resulting from the temporal variability of the light bundles and their superimposition and their evaluation.

Figure 2A:
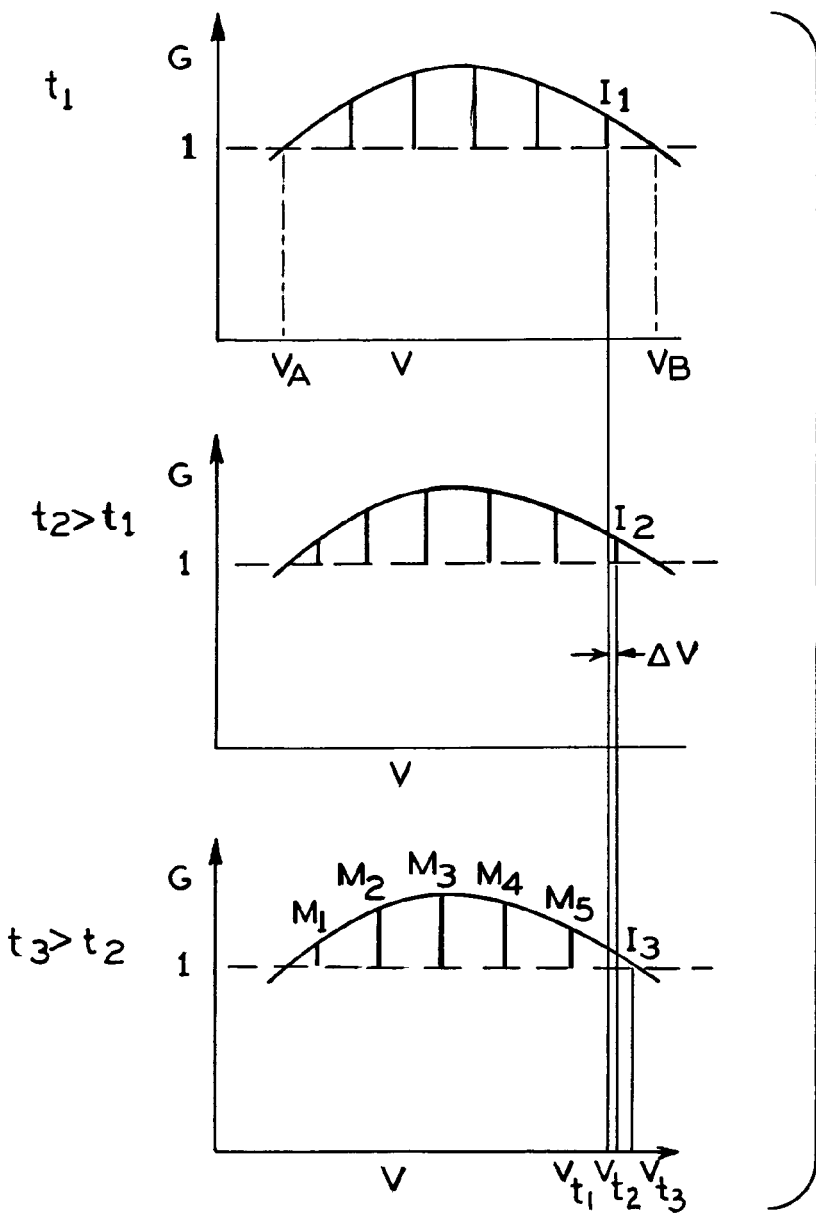
FIG. 2a frequencies of the frequency comb emitted by a laser resonator at three different times.

FIG. 2a shows the amplification profile of the amplification medium 2b above first as an oscillated curve. A light amplification by light waves flowing into the amplification medium only takes place for those frequencies for which the amplification is greater than 1, that is, between the frequencies $v_A$ and $v_B$. With all other frequencies the light is weakened as usual. The optical resonator now has, similar to an oscillating string, preferred frequencies, so-called resonator modes. Those resonator modes for which the amplification of the amplified medium is greater than 1 are preferably emitted.

If the acousto-optical modulator is now excited, a grid of variably dense areas results by means of the material oscillation; light passing through is diffracted at this grid, whereby the interaction of the light photons with the oscillation modes of the acousto-optical modulator characterizing phonons shifts the frequency of the light diffracted at the density grid by the excitation frequency of the acousto-optical modulator. This results in a slight shifting of the laser modes over time. This is only indicated for a single laser mode from the $1^{st}$ to the $2^{nd}$ image and from the $2^{nd}$ to the $3^{rd}$ image for variable times, where it is to be recognized that the frequency of a mode changes with time; this however applies for all modes that begin oscillating in the resonator. In the process it goes without saying that, depending on how far above the amplification 1 the amplification profile runs, the intensities of the individual oscillating modes are variable and that the mode intensity changes with the frequency.

Figure 2B:
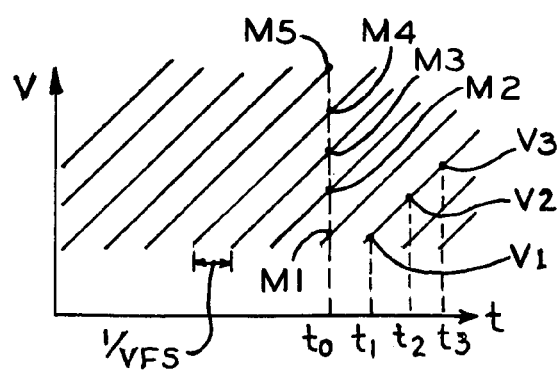
FIG. 2b the emission behavior during the time.

FIG. 2b shows the trend of the variable modes of the resulting frequency comb over time. It is to be recognized that the frequencies change over time for all modes in the same manner, thus possessing the same pitch when applied to the time.

The diagram of FIG. 2b implies that light that is emitted at different times will possess different frequencies. If light beams now arrive at an area which are irradiated at variably long optical paths, that is, were also emitted at different times from the light bundle generating medium 2, there must be a frequency difference between the two. This frequency difference is represented in FIG. 2c for differing runtime differences and different modes in the resonator. It can be detected as a beat frequency on a CMOS element.

The frequency shift between object light beam and reference light bundle is first dependent only on the runtime difference, provided a corresponding linearity of the acousto-optical modulator is assumed and the acousto-optical modulation frequency is fixed. The same dependency results for all modes. (The beat parts originating from the individual modes add up accordingly.)

The frequency shift is further dependent on which frequency the acousto-optical modulator is excited. If the excitation frequency of the acousto-optical modulator is changed, the pitch of the curve changes and the distance of the individual "teeth", that is of those levels for which a given optical path length difference results in a null frequency shift again.

Against this background the arrangement of FIG. 1 is used in the following way:

First an object 10 is arranged in the field of vision of the split part of the output light bundle 2a in such a way that it is illuminated. Then an optical projected image of the object is taken with the image receiver 12 and specific places whose penetrations are to be specified are selected, for example places A and B. The selection of these places can occur under consideration of the optical projected image using the input medium 7c. The elements ($i_I$, $j_I$) allocated to places A and B on the light receiver 5 are selected at the selection unit 6 for signal evaluation. This results in a signal being given to the demodulation unit 7a by the selected CMOS elements ($i_I$, $j_I$). In the case of element $i_I$, $j_I$, a single beam of the object light bundle 4 is superimposed with a single beam of the reference light bundle 3; in this connection beam means "a small area of an expanded bundle".

In the demodulation unit 7a the beat frequency $\Delta v$ is determined for the array element $i_I$, $j_I$ and a corresponding signal is fed to the central data processing unit. The central data processing unit 7b now changes the excitation frequency $f_a$ of the acousto-optical modulator successively step by step in prime steps and determines the resulting beat frequencies on array element i, j. From the total signals gained thereby it is then determined which multiple of a frequency shift is actually present and the corresponding path length difference of the reference and object light beams is determined for this array element $i_I$, $j_I$.

Then the actual coordinates (x, y, z) of object 10 can be inferred using the geometric method from the path length difference and the position. By selecting suitable points A, B, etc., the object can be measured at characteristically important places. The measuring can take place very rapidly, so that more than 30, for example currently up to about 2,000 points can easily be created in real time without greater switching expenditure.

With a correspondingly high modulation frequency precisions in the acousto-optical modulator in the micrometer range or submicrometer range can easily be achieved, which with the high time resolutions makes measurements possible on rapidly moved shafts, tool parts, loudspeaker diaphragms etc. In the process the simultaneous recording of an optical image gives information for a user that is particularly easy to evaluate.

It is to be pointed out that both ring resonators and also linear resonators can be used as resonators for the FSF laser. It is further to be pointed out that in place of CMOS element fields for the detection or the transfer of selected beams of different, sufficiently fast light receivers and/or detector fields can also be used as available in the state of the art.

The invention claimed is:

1. A method for object detection, comprising:
generating temporally variable expanded reference and object light beams using a frequency shifted feed-back laser,
superimposing the beams at a light receiver,
detecting the beams at the light receiver ray by ray; and
determining an object depth for selected rays in response to the temporal variability of the superimposed rays.

2. The method according to claim 1, wherein the light beams are generated with a comb-like frequency structure.

3. The method according to claim 2, wherein the frequency comb is tuned.

4. The method according to claim 1, wherein the temporal variability of the reference and object light beams occurs by means of the frequency shifted feed-back laser, the laser comprising at least a light amplifier in a resonator with temporally variable optical length.

5. The method according to claim 3, wherein successively more tuning frequencies are used.

6. The method according to one claim 1, wherein an acousto-optical modulator is used to cause a temporal variability, in particular an acousto-optical modulator installed in a resonator and excited with high frequency.

7. The method according to claim 1, wherein a multitude of detection elements is provided in the superimposed beams, and the object depth is determined only for a selection of detection elements.

8. The method according to claim 7, wherein the selection of the detection elements is performed using an optical projected image of the object.

9. The method according to claim 1, wherein the object light beam is also detected with an imaging detector.

10. The method according to claim 9, wherein the imaging detector used for detecting the object light beam is different from a light receiver which is used to determine the temporal variability of the superimposed rays.

11. A device for object detection, comprising:
a frequency shifted feedback laser for generating expanded temporally variable reference and object light beams;
a receiver having a multitude of detection elements for ray-by-ray detection of object and reference light beams; and
an evaluation unit for evaluating the signature resulting from the superposition of the temporally variable object and reference rays.

12. The device according to claim 11, wherein the frequency shifted feedback laser comprises an optical resonator, light amplifier and a modulator.

13. The device according to claim 12, wherein the modulator is an acousto-optical modulator.

14. The device according to claim 13, wherein the acousto-optical modulator is connected to a frequency generator with a frequency between 0.1 MHz and 500 MHz.

15. The device according to claim 14, wherein the acousto-optical modulator is connected to a frequency generator with a frequency of approximately 100 MHz.

16. The device according to claim 12, wherein a selection unit is provided for selection of light receiver-detection elements to be read out or evaluated.

17. The device according to claim 16, wherein an imaging sensor array is provided.

18. The device according to claim 17, wherein the imaging sensor array is different from the light receiver.

19. The device according to claim 18, wherein the imaging sensor array and the light receiver have different spectral sensitivities.

20. The device according to claim 19, wherein the imaging sensor array is not sensitive to the wavelengths of the beam generating medium.

* * * * *